US007801540B2

(12) United States Patent
Jamali et al.

(10) Patent No.: US 7,801,540 B2
(45) Date of Patent: Sep. 21, 2010

(54) ARCHITECTURE FOR DELIVERING DATA TO MOBILE TELEMATICS UNITS

(75) Inventors: Hamadi Jamali, Oakland Charter Township, MI (US); Sethu Madhavan, Canton, MI (US); Ki Hak Yi, Winsor (CA); Elizabeth Chesnutt, Troy, MI (US); Dana B. Fecher, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 756 days.

(21) Appl. No.: 11/556,889

(22) Filed: Nov. 6, 2006

(65) Prior Publication Data
US 2008/0108335 A1 May 8, 2008

(51) Int. Cl.
*H04W 4/00* (2009.01)
*H04M 1/66* (2006.01)
*H04M 1/68* (2006.01)
*H04M 3/42* (2006.01)

(52) U.S. Cl. .................. 455/466; 455/414.1; 455/410

(58) Field of Classification Search .............. 455/466, 455/456.1, 456.2, 456.3, 414.1, 414.2
See application file for complete search history.

(56) References Cited

U.S. PATENT DOCUMENTS

| 5,432,841 | A  | * | 7/1995 | Rimer | 455/457 |
| 6,925,568 | B1 | * | 8/2005 | Heinonen | 713/193 |
| 6,970,711 | B2 | * | 11/2005 | Mizell et al. | 455/466 |
| 2004/0052214 | A1 | * | 3/2004 | Teh et al. | 370/238 |
| 2004/0106396 | A1 | * | 6/2004 | Segura et al. | 455/414.1 |
| 2004/0176128 | A1 | * | 9/2004 | Grabelsky et al. | 455/553.1 |
| 2004/0209602 | A1 | * | 10/2004 | Joyce et al. | 455/414.1 |
| 2005/0288045 | A1 | * | 12/2005 | Yang et al. | 455/466 |

FOREIGN PATENT DOCUMENTS

CN 1377465 A 10/2002

OTHER PUBLICATIONS

U.S. Appl. No. 11/261,999, filed Oct. 28, 2005, Assigned to General Motors Corporation.

* cited by examiner

*Primary Examiner*—Un C Cho
(74) *Attorney, Agent, or Firm*—Leydig, Voit & Mayer

(57) ABSTRACT

An improved mobile connectivity system and method allow for data transfers, such as related to service delivery, to and from mobile wireless units in an economical and secure manner. The system utilizes existing IP connectivity when available and otherwise determines an appropriate data exchange mechanism based on the length and security requirements of the intended exchange. Data exchange mechanisms include SMS, IP and other suitable protocols, and wireless carriers include cellular and non-cellular wireless carriers. In an example, each subscriber unit periodically, or when triggered, sends its location to a call center to allow the delivery of location-based services.

11 Claims, 8 Drawing Sheets

ARCHITECTURE FOR DELIVERING DATA TO MOBILE TELEMATICS UNITS

BACKGROUND OF THE INVENTION

Wireless communications are now widespread, and serve to enhance the connectivity of individuals and organizations to provide improved information exchange, security, and profitability. As one example, telematics units are now sold with or added to many cars and other vehicles and can provide wireless communication and location-based services.

Typically though not invariably, such units operate via a cellular network infrastructure. Cellular networks provide almost universal coverage of the world's population for voice and simple data communications. Indeed, some experts estimate that at least 90% of the world's population will be served by cellular networks within less than 5 years. Cellular voice communications efficiently use mechanisms such as handoff and roaming to ensure continued connectivity. However, the technology for providing IP (Internet Protocol) connectivity for devices connected over these same networks and other similar networks is in a far weaker state of development.

For example, there are currently no effective means in the cellular network for a call center to ascertain the IP address of a vehicle (i.e., the telematics unit in the vehicle) even when the vehicle is IP connected with the primary provider with which the call center has an existing contract. Although it is possible for the center to use a voice call initially to obtain the IP address from the vehicle and then use that IP address for further communications, this is very expensive since it requires the use of voice minutes. In addition, it is sometimes cumbersome for the user to engage in a conversation every time IP connectivity is needed or desired.

There are technologies available today for exchanging data with a telematics unit. For example, data may be sent to a cellular device through the use of SMS (Short Message Service). SMS provides a channel to send and receive limited alphanumeric messages to and from cellular devices. SMS is also used as a transport for binary payloads. In practice, SMS is often used for brief exchanges including text messaging, coupon transmission, etc. Applications also exist that use SMS to awaken cellular devices and prompt them to retrieve e-mail.

However, as useful and widespread as SMS is for certain tasks, it suffers certain shortcomings with respect to data transmissions more generally. For example, SMS does not typically provide as high a level of security as IP and it is also not able to economically process messages beyond a certain length. A system is needed to enhance the data connectivity of mobile devices.

BRIEF SUMMARY OF THE INVENTION

The invention relates generally to a system that provides for the transmission of data to a mobile device while overcoming the shortcomings of the prior art. In one example, a call center is able to transmit data to a mobile cellular device, e.g., a vehicle telematics unit, at any time and wherever the vehicle might be. Although the caller may use SMS if appropriate, it can also now use IP if necessary, e.g., for long and/or secure messages.

In a further example, the described infrastructure is used to deliver location based services to the mobile unit. In particular, the call center may use the described techniques to collect vehicle locations and update them on a regular basis. This in turn provides the ability to deliver targeted location based services to any vehicle or other mobile unit at any time.

While aspects of the invention will be discussed in detail below, the following brief summary provides an overview of certain elements of the described examples. In one example, it is first determined whether an IP connection already exists with the vehicle or other unit in question. If the connection exists, the vehicle is contacted through that IP address and the message of interest is sent to the vehicle through that IP connection after execution of the necessary authentication and credential verification processes.

However, if an IP connection to the vehicle does not currently exist, the level of security to be applied to the message is checked. If a highest level of security is to be used, an SMS message is used to cause the recipient to initiate an IP session with the caller, e.g., the call center. When the vehicle responds and the IP connection is opened, the center sends the message to the vehicle after the necessary authentication and credential verification as before.

If on the other hand secure SMS is sufficient for the level of security to be applied to the message, then the message size requirement is checked. If the message is at or below a predetermined size limit, e.g., 140 bytes, then the message is sent to the vehicle via SMS.

In this case, even though the service or the message is already delivered to the vehicle, it may be advantageous for the vehicle telematics unit to nonetheless obtain an IP address and establish a PPP (Point to Point Protocol) session with the network. The IP address can then be used to facilitate contact with the unit in the near future (e.g., the same day) if the need arises.

If the message to be sent to the vehicle is data intensive such that it is larger than the predetermined size limit, an SMS message is sent to the vehicle unit as discussed above to request that the vehicle unit establish an IP session with the caller. When the vehicle responds, the message or service can then be delivered via IP after the necessary authentication and credential verification.

Whether an IP session exists or is created, it can be preserved for future use to optimize communications. In particular, in an example, the IP connection is an always on connection such that session is not terminated voluntarily. If the PPP session becomes non-responsive or is lost, SMS messaging can be used as needed to establish a new session.

According to a further example, the system allows the telematics unit of a vehicle to be reachable by the call center when the unit is roaming, the vehicle ignition is turned off the unit is discontinuous reception mode or standby mode, and even after discontinuous reception mode has expired (as long as the vehicle is turned on soon enough after the message was sent to be able to retrieve it).

The vehicle does not need to use a cellular network for establishing the IP session with the center. Alternative carriers such as WiFi can be more economical to use and may provide better performance. Thus, upon receiving the SMS message, a vehicle can use these devices instead for IP connectivity if the vehicle is appropriately equipped and if the use of such alternatives is preferred.

In one example, the connectivity system and method allow a service provider to provide location-based services to vehicles. Each vehicle periodically sends its location to the center. Alternatively, a unit may send its location only when triggered by one or more predetermined events. The service or data is then downloaded to the unit.

Other objects and advantages of the invention will become apparent upon reading the following detailed description and upon reference to the drawings.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
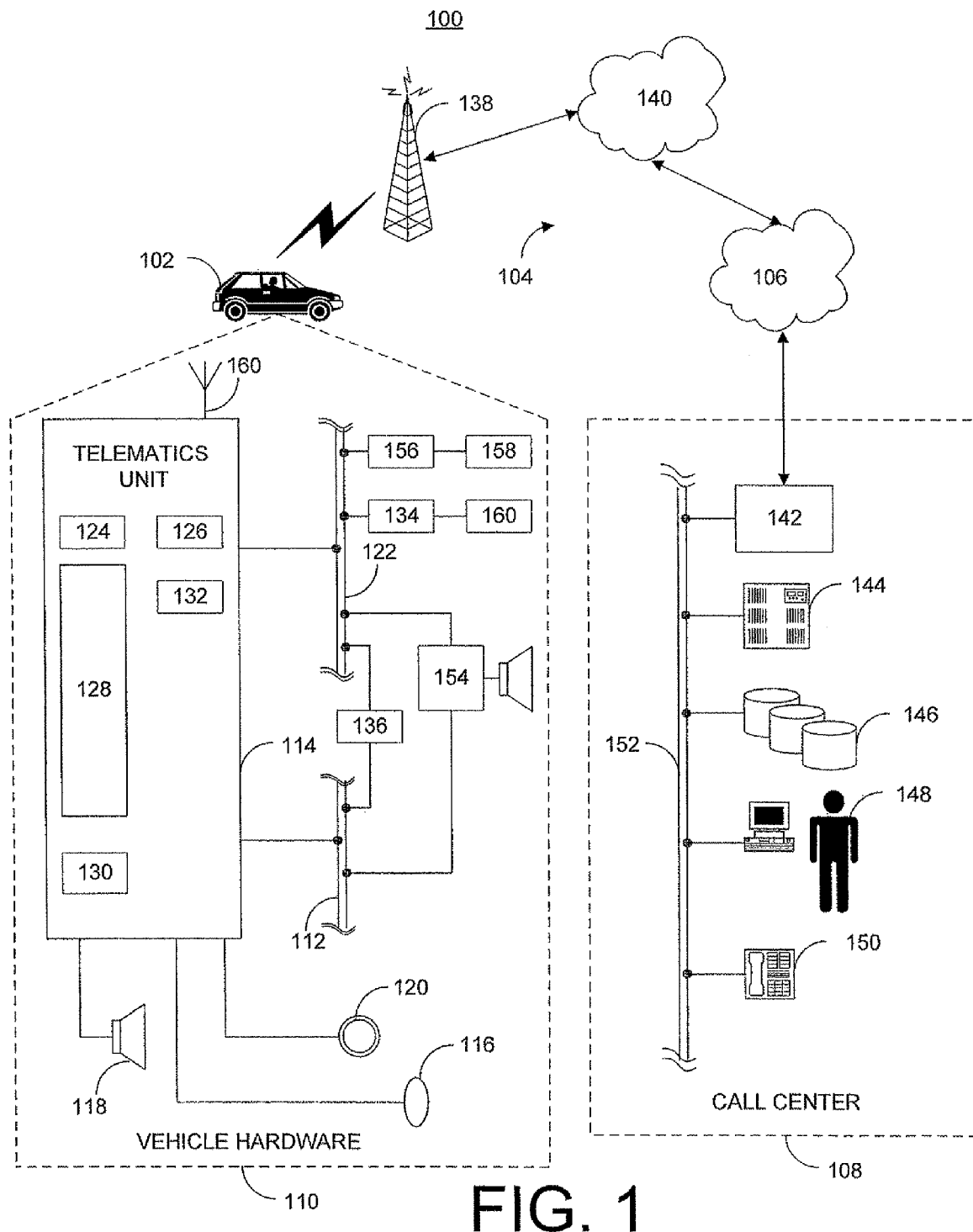
FIG. 1 is a schematic view of an example communication system within which examples of the present invention may be used.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components, of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 10 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108 and generally includes an electronic processing device 128, one or more types of electronic memory 130, a cellular chipset/component 124, a wireless modem 126, a dual antenna 160 and a navigation unit containing a GPS chip/component 132. In one example, the wireless modem 126 is comprised of a computer program and/or set of software routines executing within processing device 128.

The telematics unit 114 provides too many services to list them all, but several examples include: turn-by-turn directions and other navigation related services provided in conjunction with GPS based chipset/component 132; airbag deployment notification and other emergency or roadside assistance-related serviced provided in connection with various crash and/or collision sensor interface modules 156 and sensors 158 located throughout the vehicle 110. Infotainment-related services where music, Web pages, movies, television programs, videogames and/or other content is downloaded by an infotainment center 132 operatively connected to the telematics unit 114 via vehicle bus 122 and audio bus 112. In one example, downloaded content is stored for current or later playback.

Again, the above-listed services are by no means an exhaustive list of all of the capabilities of telematics unit 114, as should be appreciated by those skilled in the art, but are simply an illustration of some of the services that the telematics unit 114 is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual antenna 160 services the GPS chipset/component 124 and the cellular chipset/component 126.

Microphone 116 provides the driver or other vehicle occupants with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware 110 also includes one or more buttons or controls 120 for enabling a vehicle occupant to activate or engage one or more of the vehicle hardware 110 components. For example, one of the buttons 120 can be an electronic pushbutton used to initiate voice communications with the call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 received analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on the vehicle bus 112 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the force sustained.

Vehicle sensors 160, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/based station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations 140, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 may store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The Examples herein will disclose a preferred technique and system for allowing a call center to transmit data to a vehicle having a telematics unit without knowledge beforehand regarding the whereabouts or connectivity of the telematics unit associated with the vehicle. As will become apparent hereinafter, the described system can provide the ability for a call center to use IP connections to reach a selected vehicle essentially anywhere where connectivity can be provided, at any time. The described technique according to further examples provides the ability to collect vehicle locations and update them on a regular basis. Finally, it will be appreciated from the following examples that the novel system and method described herein support the ability to deliver targeted location-based services to vehicles equipped with an appropriate telematics unit.

A number of communications protocols will be used in the described examples. It will be appreciated that many of the individual protocols are known to those of skill in the art. As such, details regarding the protocols themselves may be provided to aid readers of lesser experience with the understanding that such details are provided for the reader's convenience and not out of necessity.

The methods of the following examples are ideally employed in an environment including a telematics-equipped vehicle and wholly or partially wireless communications infrastructure as described above by reference to FIG. 1. It will be appreciated that the illustration of FIG. 1 describes an exemplary system, and that many of the elements of FIG. 1 are not essential to the operation of the invention described in the various examples herein. For example, although use of the system with respect to a telematics-equipped vehicle is described, the system is also useful for mobile telematics units associated with an individual and/or associated variously with different ones of a group of vehicles.

In overview, when a data exchange is desired or required with respect to a telematics unit, such as to provide a service, a call center system such as element 108 of FIG. 1, first determines if an IP connection has already been established with the telematics unit of interest. If such a connection is already in place, the telematics unit is contacted by the call center through that IP address. Subsequent to the necessary authentication process and credential verification process, the call center sends the message to the telematics unit through that IP connection.

Even when no IP connection to the vehicle exists, the system is still able to provide the necessary communications. After determining that there is no existing IP connection, the call center chooses a connection mechanism based on the size and security requirements of the anticipated data transfer. For communications such as those containing personal or financial information requiring the highest security, a message is sent to the telematics unit requesting it to initiate an IP session with the call center. After the telematics unit responds and the necessary authentication and credential verification processes are executed, the call center sends the message to the telematics unit. This technique may also be applied where the data transfer is not sensitive, but it is nonetheless too large to be economically sent via the short message protocol.

In the event that the anticipated communication does not require the highest available security and if the message is sufficiently small, a secure short messaging protocol may be used instead of an IP connection. In this case, it may desirable after delivery of the data via short message protocol, to establish an IP connection for later use. Thus, the telematics unit may still obtain an IP address and establish a session with the call center.

Although the examples herein focus primarily on the use of the cellular network, it will be appreciated that the communications with the telematics unit may be executed additionally or alternatively via other wireless technologies such as WiFi or Bluetooth. In individual cases, the choice as to whether to use the cellular network for the IP connection or instead to use other wireless technologies will often be based on parameters of cost and/or performance. Thus, for example, upon receiving a connection request via the cellular network, the telematics unit may use a WiFi or Bluetooth channel for establishing IP connectivity.

In an example of the invention, the IP communications system is used to allow the call center to provide location-based services to vehicles. For example, information provided by a weather update service may depend upon the vehicle's location. As another example, data regarding nearest food service facilities, gas stations, entertainment venues, and so on will be location-dependent.

Figure 2:
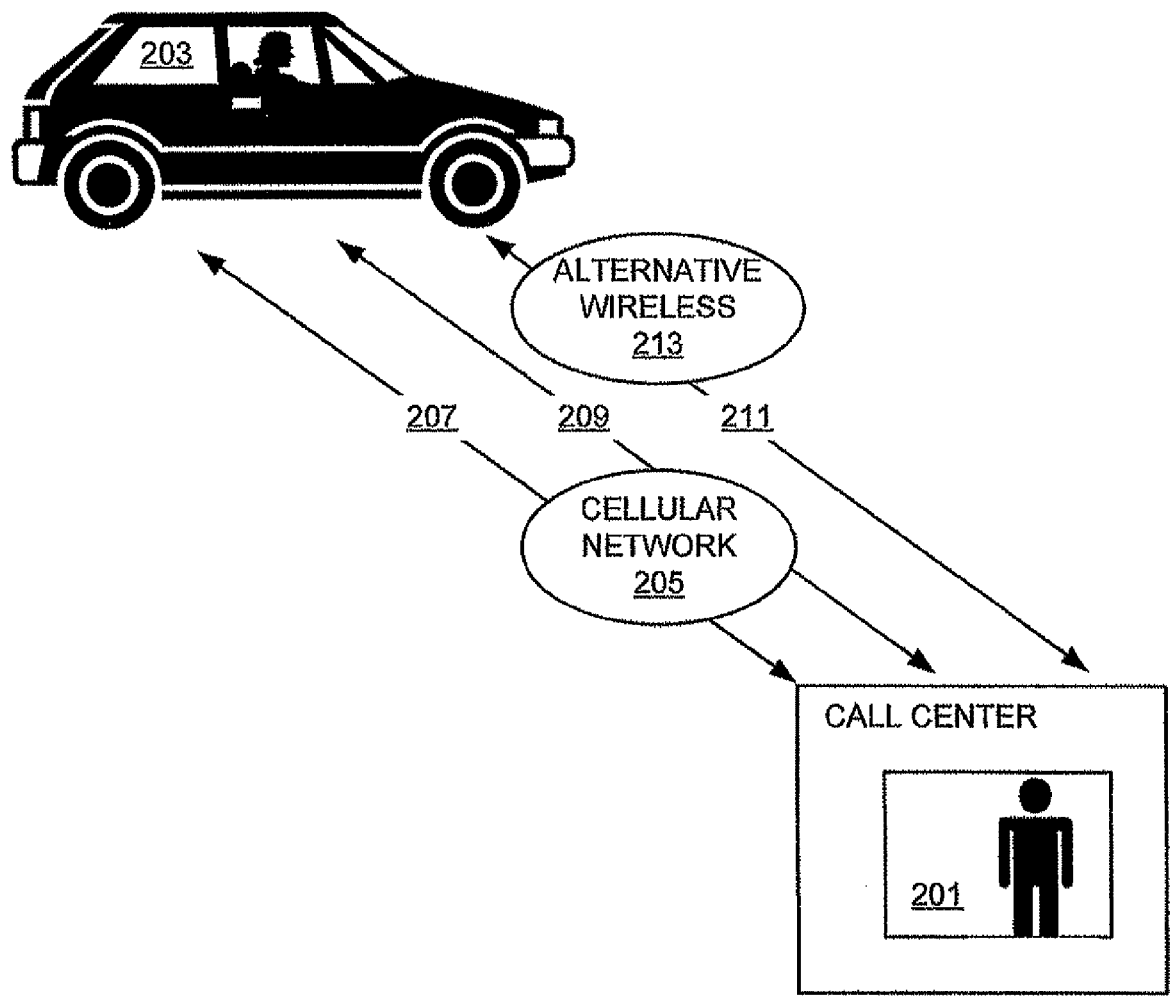
FIG. 2 is a schematic diagram of network connectivity between a call center and a mobile telematics unit in an example of the invention.

Having discussed aspects of the invention in overview, various examples will now be discussed in greater detail with reference to FIGS. 2-8. FIG. 2 is a schematic diagram of the network connectivity between the call center and mobile telematics unit in an example of the invention. The call center 201 is initially linkable to the telematics unit 203 via the cellular network 205. Typically, messages are exchanged between the call center 201 and the telematics unit 203 via the SMS protocol. The SMS (Short Message Service) protocol is a text message service that allows short messages (e.g., those having less than about 140-160 characters) to be transmitted over the cellular network 205. SMS, first introduced in the GSM system, is supported by most digital mobile communications systems. SMS is similar to e-mail in that the messages are stored and forwarded at SMS centers, as opposed to residing solely on the mobile unit. As such, the mobile unit can later retrieve the appropriate messages if it was offline or otherwise unavailable when the messages were originally sent. Generally, SMS messages travel to the telematics unit 203 over the cellular system's control channel 207, which is generally logically separate from the system's voice channel 209.

Although SMS is popular and widely used, it is not as secure as some other types of connections such as IP connections. Thus, in some examples, rather than using SMS for transferring sensitive data, the SMS service may used to establish a separate IP connection 211. The separate IP connection 211 may be facilitated via the cellular network 205 or may instead utilize another wireless system 213 such as a Bluetooth or WiFi system. Because the cellular network 205 is not typically optimized for substantial data transmission, it may be desirable for cost or performance reasons to use the alternative wireless network 213. In addition, the availability of alternative wireless networks in a given locale can also be determinative of whether such networks may be used.

Figure 3:
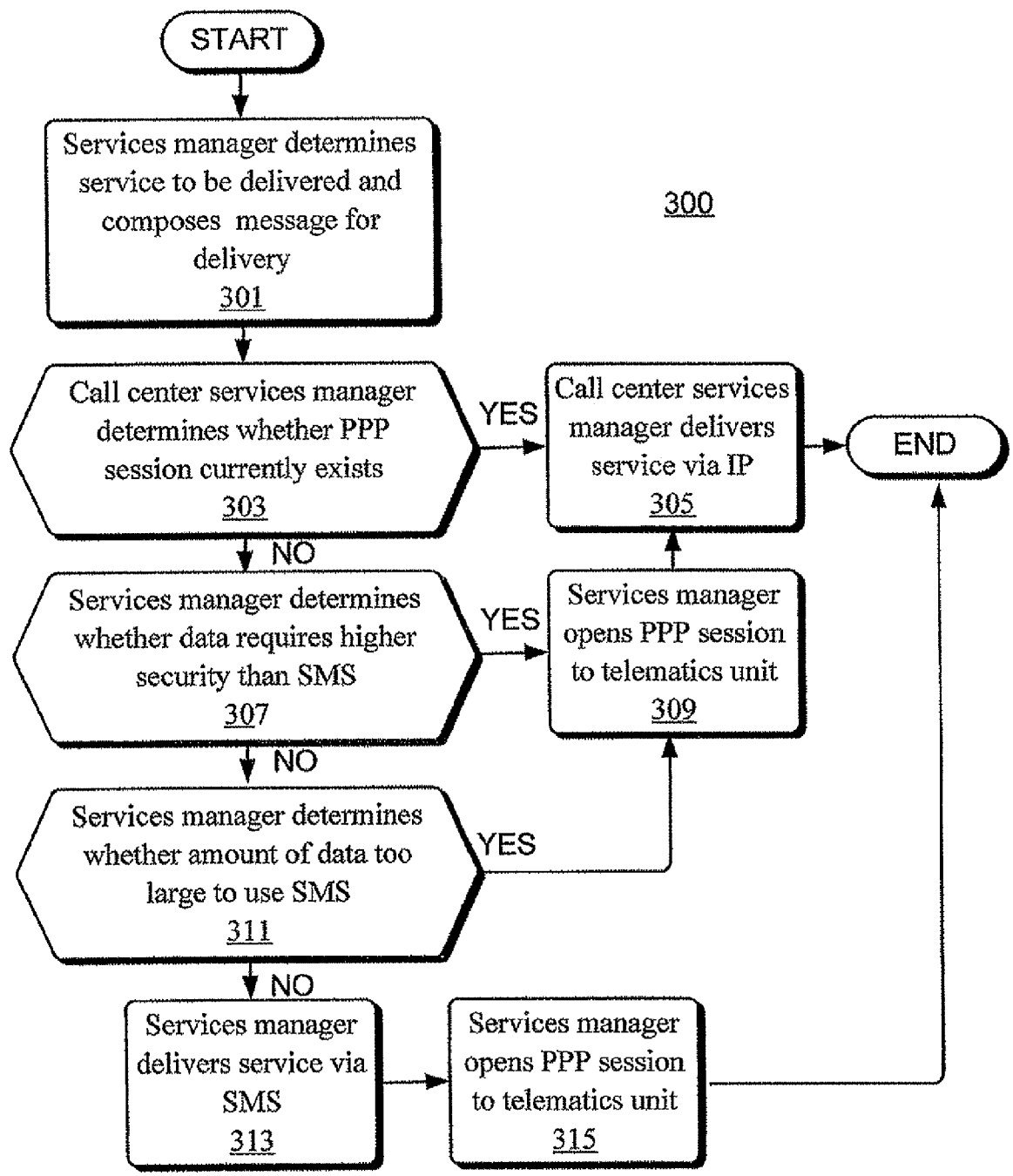
FIG. 3 is a flow chart showing the steps taken according to one example of the invention to deliver data or services to a telematics unit.

Having discussed the general connectivity available for use between the telematics unit 203 and the call center 201, the use of this infrastructure in several illustrative examples will now be discussed in greater detail. FIG. 3 is a flow chart 300 showing the steps taken according to one example to deliver data or services to a telematics unit. The process begins at stage 301 wherein a services manager module of the call center determines that a service is to be delivered to an identified remote telematics unit, such as may be associated with a vehicle or otherwise, and composes an appropriate message for delivery. The services manager module may be within or associated with the server 144 of the call center 108. The determination to deliver a service may be pursuant to a subscription, a service update, a user request, user location data, etc.

At stage 303, the services manager module of the call center determines whether a PPP session with the remote telematics unit currently exists. It will be appreciated by those of skill in the art that PPP (Point-to-Point Protocol) is a system for transporting IP packets over a link, such as to an ISP. PPP provides a session between the telematics unit and the call center using its own Link Control Protocol (LCP). PPP supports security features such as authentication, e.g., via PAP, CHAP or EAP. As will be appreciated by those of skill in the art, PPP resides at the data link layer in the networking stack. When using PPP, high-level protocol packets such as IP packets are encapsulated in HDLC-based frames. IP is the network layer protocol in the TCP/IP communications protocol suite, and IP over PPP is sometimes referred to as IPCP.

If it is determined at stage 303 that a PPP session is extant, then the services manager causes the service of interest to be delivered via IP at stage 305. Otherwise, the process continues to stage 307, whereat the services manager determines whether the data to be sent to the telematics unit requires more security than that available through SMS.

If it is determined at stage 307 that the data to be sent to the telematics unit requires more security than SMS provides, the process flows to stage 309, whereat the services manager opens a PPP session to the telematics unit. Subsequently, the process flows back to stage 305, whereat the services manager delivers the appropriate service via IP through the PPP session.

If it is instead determined at stage 307 that the data to be sent to the telematics unit does not require more security than that available through SMS, the process flows to stage 311. At this stage, the services manager determines whether the amount of data to be sent is too large to be accommodated via SMS. If it is determined at stage 311 that the amount of data to be sent is too large to be accommodated via SMS, the process flows to stage 309, whereat the services manager opens a PPP session to the telematics unit, after which the process flows back to stage 305, whereat the services manager delivers the appropriate service via IP through the PPP session.

If it is determined stage 311 that the amount of data to be sent is not too large to be accommodated via SMS, then the process flows to stage 313, in which the services manager delivers the appropriate service via SMS. In addition, in an example of the invention, the process may flow to stage 315 after successful delivery of the service via SMS. At stage 315, the services manager opens a PPP session with the telematics unit for future use. At this point, having successfully delivered the service of interest, the process terminates.

Figure 4:
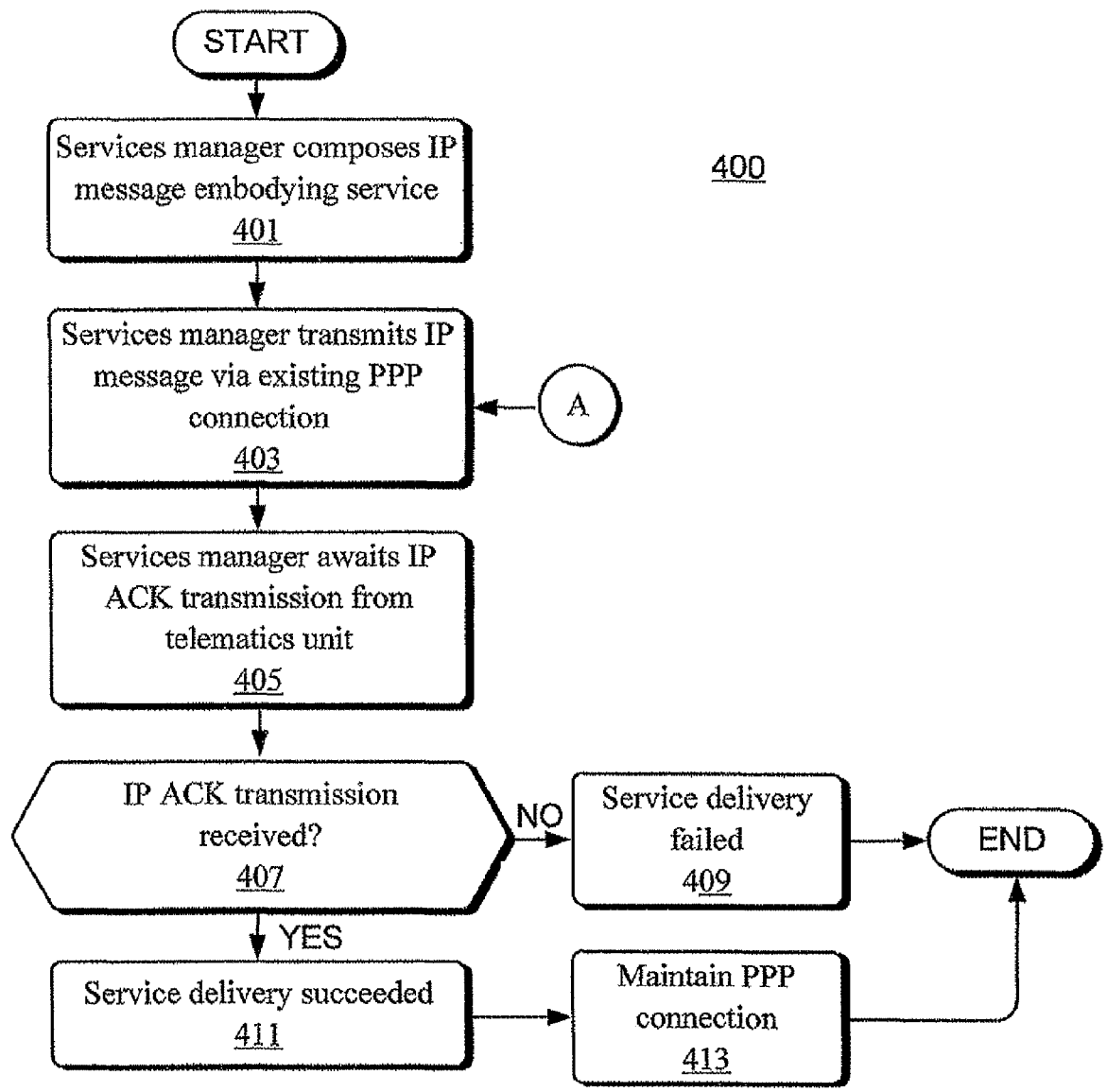
FIG. 4 is a flow chart illustrating a process for delivering a service of interest to a telematics unit via an existing PPP session.

The details of the service delivery, and connection creation where appropriate, will be discussed by reference to FIGS. 4-7. FIG. 4 is a flow chart illustrating a process for delivering a service of interest to a telematics unit via an existing PPP session as in stage 305 of the flow chart 300 of FIG. 3. The process 400 starts at stage 401, wherein the services manager composes an IP message to deliver the necessary data via the existing PPP connection. At stage 403, the services manager transmits the IP message via the existing PPP connection. At this point, the services manager awaits an IP ACK (Acknowledgement) transmission from the telematics unit in stage 405 to confirm receipt of the IP message.

At stage 407, it is determined whether an IP ACK transmission was received. If it is determined that an IP ACK message was not received, then the process branches to stage 409 whereat it determines that the service delivery failed, and the process terminates. Otherwise, the process branches to stage 411 and determines that the service delivery succeeded. After stage 411, the process optionally continues to stage 413 wherein it maintains the PPP connection. Subsequent to stage 413, the process terminates.

Figure 5:
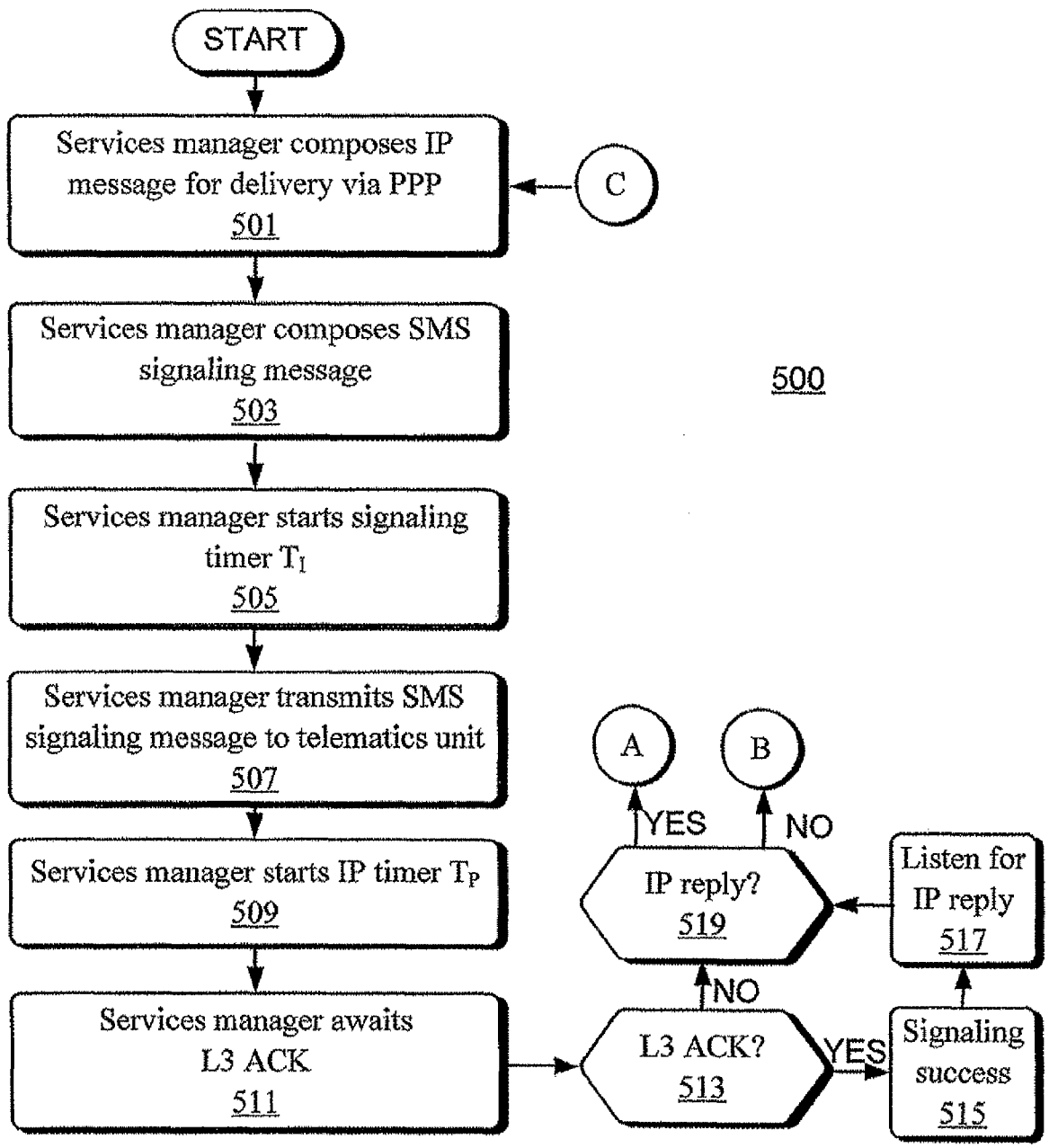
FIG. 5 is a flow chart illustrating a process for delivering a high security message regarding a service of interest to a telematics unit via a PPP session where no such session yet exists.

FIG. 5 is a flow chart illustrating a process for delivering a high security message regarding a service of interest to a telematics unit via a PPP session where no such session yet exists as in stages 309 and 305 of the flow chart 300 of FIG. 3. The process 500 begins at stage 501, wherein the services manager composes an IP message to deliver the message of interest via PPP. At stage 503, the services manager composes an SMS signaling message. The SMS signaling message is such as to cause the telematics unit to initiate a PPP session with the services manager.

The services manager starts a signaling timer $T_I$ at stage 505. At stage 507, the services manager transmits the SMS signaling message via the cellular or other wireless network to the telematics unit. At stage 509, the services manager starts an IP timer $T_P$. At stage 511, the services manager awaits a response, i.e., a layer 3 acknowledgement (L3 ACK), to the SMS signaling message. At stage 513, it is determined whether an L3 ACK message was received. If an acknowledgement is received, the process determines at stage 515 that the signaling process succeeded and moves to stage 517 to await an IP reply. If at stage 513 an L3 ACK is not received, the process flows immediately to stage 519.

Figure 6:
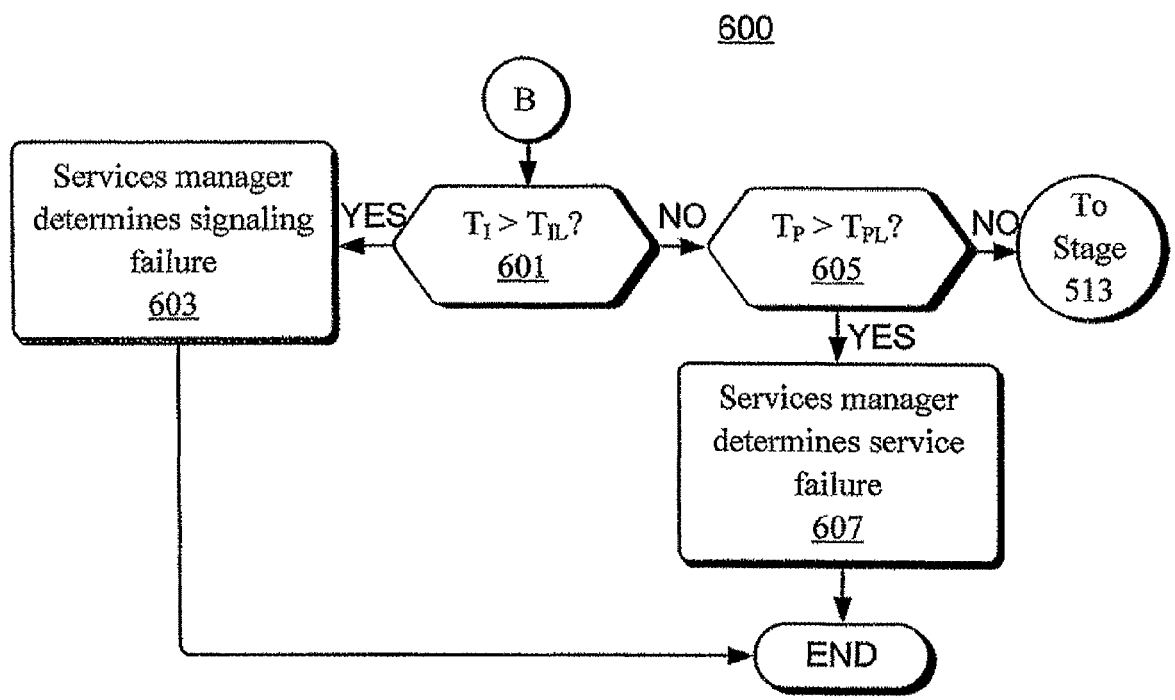
FIG. 6 is a continuation of the flow chart of FIG. 5.

If at stage 519 it is determined that an IP reply has been received, then the process flows to point A (stage 403 discussed above). Otherwise, the process flows to point B (FIG. 6). At stage 601, the services manager determines whether the time $T_I$ elapsed since setting the signaling timer exceeds a predetermined limit $T_{IL}$. If it is determined at stage 601 that $T_I > T_{IL}$, then the process flows to stage 603, at which it is determined that the signaling process has failed, and the process then terminates. If instead it is determined at stage 601 that $T_I$ is not greater than $T_{IL}$, then the process flows to stage 605. At stage 605, the services manager determines whether the time $T_P$ elapsed since setting the IP timer exceeds a predetermined limit $T_{PL}$.

If it is determined at stage 605 that the $T_P > T_{IL}$, then the process flows to stage 607, at which it is determined that the service delivery process has failed. If instead it is determined at stage 605 that $T_P$ is not greater than $T_{IL}$, then the process flows to stage 513 to await receipt of an L3 ACK message as discussed above with respect to FIG. 5.

Figure 7:
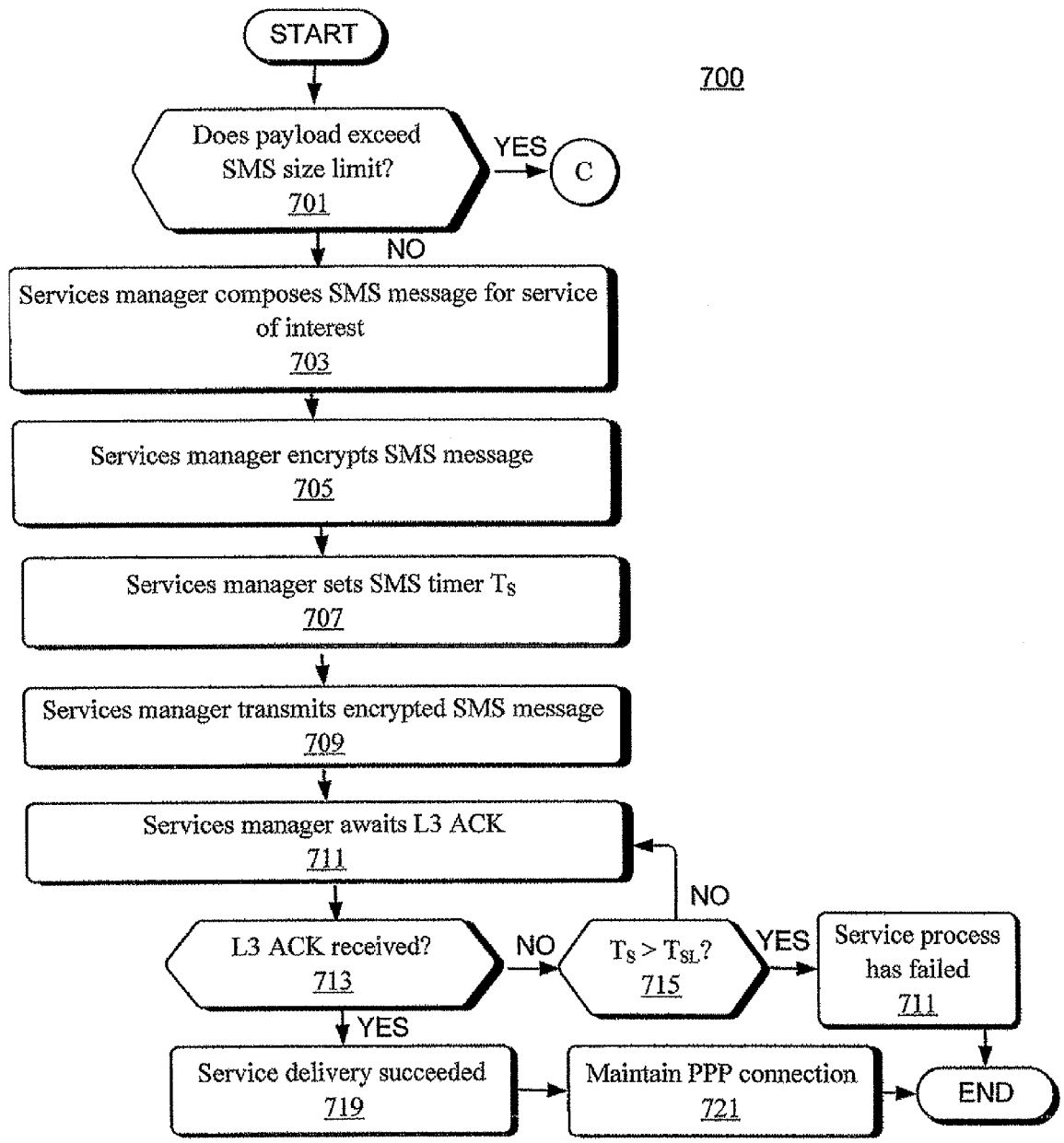
FIG. 7 is a flow chart illustrating a process for delivering a message having low security requirements regarding a service of interest to a telematics unit when a PPP session between the services manager and telematics unit does not yet exist.

FIG. 7 is a flow chart illustrating a process for delivering a message having low security requirements regarding a service of interest to a telematics unit when a PPP session between the services manager and telematics unit does not yet exist, as in stages 311 et seq. of the flow chart 300 of FIG. 3. The process 700 begins at stage 701, wherein the services manager determines whether the size of the intended payload (e.g., a message containing or implementing the service) exceeds a predetermined limit for the size of an SMS payload, e.g., 140 bytes. If it is determined at stage 701 that the size of the intended payload exceeds the predetermined SMS limit, the process flows to point C (stage 501 of process 500).

Otherwise, the process flows to stage 703. At stage 703, the services manager composes an SMS message containing or implementing the service of interest. The services manager encrypts the SMS message at stage 705. The services manager then sets an SMS timer $T_S$ at stage 707 and transmits the encrypted SMS message at stage 709. At stage 711, the services manager awaits an L3 ACK message.

The services manger determines at stage 713 whether an L3 ACK has been received. If it is determined at stage 713 that an L3 ACK message has not been received, the process flows to stage 715, whereat the services manager determines whether $T_S$ exceeds a predetermined limit $T_{SL}$. If it is determined at stage 715 that $T_S > T_{SL}$, then the services manager determines at stage 717 that the service process has failed, and the process terminates. Otherwise, the process flows back to stage 711.

If it is determined at stage 713 that an L3 ACK message has been received, the process flows instead to stage 719. At stage 719, it is determined that the service delivery process has succeeded. From stage 719, the process optionally flows to stage 721, where the services manager maintains the PPP connection for future use.

It will be appreciated that in case of signaling or delivery failure, the signaling or delivery may be reattempted. In an example, the caller waits for a time out period to expire and then reattempts the signaling or delivery.

It will be appreciated that the described example system generally allows the telematics unit of a vehicle to be reachable by the call center for substantial and/or secure data transfer when the unit is roaming, the vehicle ignition is turned off, the unit is in discontinuous reception or standby mode, or even after expiration of a discontinuous reception mode as long as the unit is energized soon enough after the message was sent to be able to retrieve it.

Moreover, it can be seen from the foregoing that the mobile unit does not need to use a cellular network for establishing the IP session with the caller, e.g., the call center. Many vehicles now are equipped with equipment to support other IP capable carriers such as WiFi or Bluetooth in addition to cellular phone devices. These alternative carriers can be more economical to use and can also provide better performance. Thus, upon receiving the SMS message, a mobile unit could instead use these alternative carriers for IP connectivity.

According to a further example of the invention, the service to be delivered is a location-based service. As used herein, "location based" information or services are information or services that are of interest to the user because of their relationship to the unit location. For example, the service may be an updating of a database of local facilities meeting certain criteria (restaurants, theaters, dealers, repair shops, etc.), an update or provision of local radio station information, an update or provision of local weather information, provision or update of navigation data or directions, the updating of local emergency contact information, and so on.

When providing location-based services or information, it is expedient for the caller, e.g., the call center, to be aware of the mobile units location with appropriate granularity. In addition, it can be inefficient although not impossible, to periodically poll each mobile unit for its location. For example, it can be wasteful to repeatedly poll a unit whose position has not changed at the appropriate level of granularity, e.g., at the level of changing counties, zip codes, area codes, or exceeding a predetermined distance from a reference location.

To this end, it is desirable that the mobile unit update the call center or other central entity of interest with its location. This can be done periodically or when the location changes sufficiently to meet one or more predetermined criteria. For example, a unit may send its location when triggered, such as by exceeding a certain radial distance from a predetermined reference location, by crossing into a new ZIP code, by crossing a county line, and so on.

Figure 8:
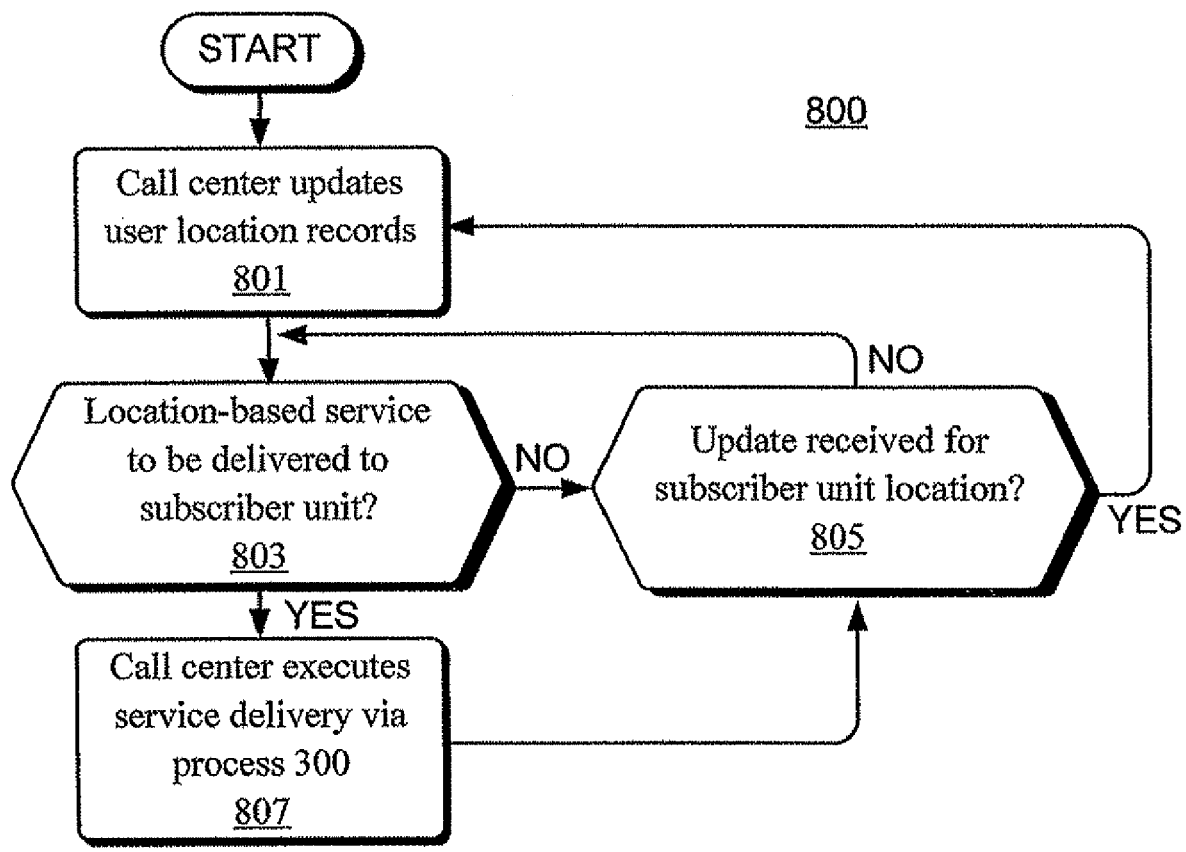
FIG. 8 is a flow chart of an example process for efficiently and securely providing a location-based service to a mobile unit.

FIG. 8 illustrates a flow chart of an example process for efficiently and securely providing a location-based service to a mobile unit from a stationary caller such as a call center. The example process is illustrated between a call center and a subscriber mobile unit such as in a vehicle as illustrated in FIG. 1, but it will be appreciated that the disclosed principles are more broadly applicable.

At stage 801 of the process 800, the call center 108 updates user location records storing the locations of subscriber mobile units. This update will usually be the result of receiving new subscriber unit location information. The locations records may comprise one or more searchable records in database 146 for example. At stage 803, the call center 108 determines whether there is a location-based service that should be delivered to a subscriber unit. Although this example focuses on a single subscriber unit for clarity, it will be appreciated that a service delivery can relate to multiple subscriber units. The determination as to whether a service is to be delivered can depend on a number of factors such as whether there is a service available for delivery, whether the subscriber unit's location has changed (i.e., within a predetermined previous interval), and whether the subscriber unit has already received the service. It can be desirable to wait a certain period, such as 10 minutes, after a location change is received to determine whether the change is transient or more long-term. To enable the determination in stage 803, the call center preferably stores the related information, e.g., location change, time of change, etc., in database 146.

If it is determined at stage 803 that there is not a location-based service that should be delivered to the subscriber unit, the process flows to stage 805, wherein the call center 108 determines whether an update has been received for the location of a subscriber unit. If such an update has been received, then the process flows to stage 801 to update the user location records. Otherwise the process flows to stage 803.

If instead it is determined at stage 803 that there is a location-based service that should be delivered to a subscriber unit, the process flows to stage 807, wherein the call center 108 executes a service delivery via a process such as the process 300 illustrated in FIG. 3. Subsequent to execution of stage 807, the process flows back to stage 805 to check for user location updates.

It will be appreciated that the foregoing methods and implementations for data exchange and service delivery are merely examples, and that these illustrate a preferred technique. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of transmitting data from a first telecommunications unit to a second telecommunications unit, wherein at least the second telecommunications unit is a mobile unit, the method comprising:
   identifying data for transfer to be provided to the second unit, the data for transfer having associated therewith a data length value and one or more security constraints;
   determining whether a PPP session is open between the first telecommunications unit and the second telecommunications unit; and
   transmitting the data for transfer from the first telecommunications unit to the second telecommunications unit via IP over the existing PPP session if a PPP session is open between the first unit and the second unit, and otherwise determining, based on at least one of the data length value and security constraints, whether to transmit the data for transfer via PPP or instead via an SMS message, wherein the step of determining further comprises determining whether the one or more security constraints specify a level of security unavailable within the SMS protocol, and if so, causing a new PPP session to be initiated by the second unit to the first unit, and transmitting the data for transfer via the new PPP session, and otherwise determining whether the data length value exceeds a predetermined SMS size limit and if so, causing a new PPP session to be initiated and transmitting the data for transfer via the new PPP session and otherwise transmitting the data for transfer via an SMS message.

2. The method according to claim 1, wherein the step of transmitting the data for transfer via an SMS message further comprises encrypting at least a portion of the data for transfer prior to transmission.

3. The method according to claim 2, wherein the data for transfer is associated with a service such that successful transmission of the data for transfer constitutes delivery of the service.

4. The method according to claim 3, wherein the service is a location-based service.

5. The method according to claim 4, wherein the location-based service comprises information selected from the group consisting of information related to local entertainment facilities, local vehicle service facilities, local radio station facilities, local weather, local navigation, and local emergency services.

6. The method according to claim 5, wherein the step of identifying the data for transfer to be provided to the second unit is initiated by receipt of a location update from the second unit indicating that the position of the second unit has changed from a first location to a second location.

7. The method according to claim 6, wherein the first location is selected from the group consisting of a county, a zip code, an area code, and a predefined geographic region.

8. The method according to claim 1, wherein causing a new PPP session to be initiated by the second telecommunications unit comprises causing a new PPP session to be opened over a cellular link.

9. The method according to claim 1, wherein causing a new PPP session to be initiated by the second telecommunications unit comprises causing a new PPP session to be opened over a non-cellular wireless link.

10. The method according to claim 1, wherein the step of transmitting the data for transfer via an SMS message further comprises a subsequent step of causing a new PPP session to be initiated by the second telecommunications unit to the first telecommunications unit.

11. The method according to claim 1, wherein the step of causing a new PPP session to be initiated by the second telecommunications unit to the first telecommunications unit comprises sending an SMS message from the first telecommunications unit to the second telecommunications unit requesting the second telecommunications unit to open the PPP session.

* * * * *